United States Patent [19]

Chajuss

[11] Patent Number: 5,210,184
[45] Date of Patent: May 11, 1993

[54] PROCESS FOR ENHANCING SOME FUNCTIONAL PROPERTIES OF PROTEINACEOUS MATERIAL

[76] Inventor: Daniel Chajuss, Misgav Dov 19, Mobile Post Emek Sorek 76867, Israel

[21] Appl. No.: 717,014

[22] Filed: Jun. 18, 1991

[30] Foreign Application Priority Data

Jun. 19, 1990 [IL] Israel ............................................. 94781

[51] Int. Cl.$^5$ ............................................. C07K 3/08
[52] U.S. Cl. ..................... 530/370; 530/372; 530/373; 530/375; 530/376; 530/377; 530/378; 530/379; 530/409; 530/424
[58] Field of Search ............. 530/409, 378, 424, 370, 530/377, 379, 372, 373, 375, 376

[56] References Cited

U.S. PATENT DOCUMENTS

| | | | |
|---|---|---|---|
| 2,044,769 | 6/1936 | Buron et al. | 530/373 |
| 2,881,159 | 4/1959 | Circle et al. | 530/378 |
| 3,594,192 | 7/1971 | Mullen et al. | 530/378 |
| 4,113,716 | 9/1978 | Gomi et al. | 530/378 |
| 4,234,620 | 11/1980 | Howard et al. | 530/427 |
| 4,421,564 | 12/1983 | Graham et al. | 530/378 |
| 4,961,788 | 10/1990 | Krinski et al. | 530/378 |

FOREIGN PATENT DOCUMENTS 633147 12/1961 Canada ................................. 530/373

*Primary Examiner*—Jeffrey E. Russel
*Attorney, Agent, or Firm*—Pollock, Vande Sande & Priddy

[57] ABSTRACT

A process for enhancing the functional properties of denatured proteinaceous material of vegetable origin. The enhanced properties include at least one property selected from the group consisting of water absorption, water binding capacity, oil binding capacity, fat binding capacity, and the ability to produce viscous aqueous suspensions. The process includes the steps of obtaining the denatured proteinaceous material by treating undenatured proteinaceous material with aqueous alcohol and maintaining a slurry of the denatured proteinaceous material in warm aqueous ammonia in which the weight ratio of the aqueous phase to solids is between 3:1 and 15:1 at a temperature between 75° C. to 100° C. and within a pH range of from 8.0 to 9.5.

11 Claims, No Drawings

PROCESS FOR ENHANCING SOME FUNCTIONAL PROPERTIES OF PROTEINACEOUS MATERIAL

FIELD OF THE INVENTION

The invention relates to a process for enhancing some of the functional properties of denatured proteinaceous material of vegetable origin.

BACKGROUND OF THE INVENTION

Vegetable protein products obtained from seed and leaf materials are used as replacements and extenders for proteins derived from animal, marine and poultry sources. Such vegetable protein products are usually low fat or defatted materials. They are commonly referred to as "flours" if they contain less than 65% protein, as "concentrates" if they contain from 65 to 90% protein and as "isolates" if they contain above 90% protein. Some methods for manufacturing vegetable protein products customarily include heat treatment and aqueous alcohol extraction, as well as other chemical treatments and applied conditions which denature and substantially reduce the functional properties of the proteinaceous products. These functional properties of such proteins are characterized by their ability to hold oil or fat and water, to emulsify and to form protein-containing products having a firm consistency.

Since these functional properties of the protein in a vegetable protein product are desired characteristics in many applications, as for example in food recipes (e.g. in meat, dairy and bakery products) and in industrial applications (e.g. in the paper coating industry), the enhancing of these properties in low functional proteinaceous materials is thus of substantial economic and technological importance.

Although one of the functional properties of protein is its solubility, the other properties are not necessarily interdependent on the protein solubility and soluble protein material can have other poor functional properties, while protein material of low solubility can have high functional properties. It is well known that protein material which is normally soluble at pH's other than its isoelectric pH, has a reduced solubility in all pH ranges when it becomes denatured and will not be affected by either simple alkaline or acid treatments which will only change the pH. Likewise, upon denaturing, most of the original functional properties, as hereinbefore stated, will be lost.

Prior art teachings indicate that in order to introduce or regenerate some of these functional properties in denatured material, either, high temperatures above the boiling point of water, such as are obtained by steam jet cookers, or high shear forces, as obtained by successive pressure and cavitation cycling, such for example, by using a centrifugal homogenizer, must be employed on an aqueous, slightly alkaline slurry of the denatured proteinaceous material.

A patent by Gobi et al, (U.S. Pat. No. 4,113,716) discloses a process designed to obtain improved soy protein fractions from previously denatured soy protein material by cooking slightly alkaline aqueous slurry of the denatured soy protein material at temperatures between 110° C. to 150° in a jet cooker chamber and obtaining from this high temperature treated material soluble fractions with "properties superior to those obtained by using undenatured defatted soy flakes as starting material."

A patent by Howard et al (U.S. Pat. No. 4,234,620) discloses a process in which aqueous vegetable protein dispersions are subjected to high shear forces of successive pressure and cavitation cycling obtained by centrifugal homogenization at temperatures below 150° C., under slight alkaline pH's, to provide a high protein solubility, low viscosity product at high solids levels, which may be dried, generally after pH adjustment with acid, to provide a vegetable protein product similar to milk protein.

British Patent No. 1,575,052 discloses that the flavor, color, nutritive value and some functional properties of protein material selected from single cell protein material, plant protein material, whey solids and mixtures thereof can be improved by heating aqueous slurries of the protein material to temperatures ranging from 75° to 100° C., adjusting the pH to a pH range of 6.6 to 8, preferably 7.2 to 7.6, by adding a pH adjusting compound, preferably a calcium compound, maintaining the temperature for a period of 1–120 minutes and drying the product. The product obtained may be used as a replacer for egg solids and non-fat dry milk, especially in baked goods, as the process reduces the yeasty off-flavor, releases buffering materials from yeast cell material, saponifies lipid material and reduces available thiol (-SH) groups.

The present invention is based on a surprising discovery that some of the functional properties of denatured protein in a vegetable protein product can be enhanced, without causing substantial changes in the protein by a very simple, economical and efficient process. The enhanced properties include the ability to hold oil or fat and water, to emulsify and to form products of firm consistency. The process of the present invention does not require the use of temperatures above 100° C., nor any special equipment or forces. As will be seen from the details described below, the process of the invention provides a simple low-cost vegetable protein product having improved functional properties compared with corresponding untreated denatured proteinaceous material.

It is the object of the present invention to enhance the functional properties of denatured vegetable proteinaceous material having poor functional properties.

Another object of the invention is to enhance the functional properties of denatured vegetable proteinaceous material without fractionation, without addition or introduction of salts, without super-heating above water boiling temperature, and without the use of high shear forces such as obtained by centrifugal homogenization.

Yet another object of the invention is to provide a simple, efficient and economical process to achieve the same.

A further object of the invention is to provide a vegetable proteinaceous material having enhanced functional properties.

SUMMARY OF THE INVENTION

The invention thus provides a process for increasing the functional properties of denatured proteinaceous material of vegetable origin, having relatively poor functional properties, which comprises maintaining such denatured proteinaceous material in warm aqueous ammonia at a temperature between 75° C. to 100° C. and a pH of about 8 to 9.5, wherein the ratio of the aqueous phase to solids in the slurry is from about 3:1 to 15:1. The time can vary from less than 1 minute to several hours depending on the type of denatured protein, its particle size, the temperature and pH. The ammonia may then be stripped off after the treatment to obtain an ammonia-free, salt-free highly functional proteinaceous product. This product is capable of providing a high viscosity product at low solids levels upon addition of water, without the material having undergone any substantial chemical change with the exception of functionality.

Also included within the scope of the invention is denatured proteinaceous material of vegetable origin which has been treated in accordance with the process of the invention.

DETAILED DESCRIPTION OF THE INVENTION

It will be appreciated that, in general, the enhanced functional properties obtained by the process of the invention are measured by an increase in the ability of the proteinaceous material to hold oil or fat and water, to emulsify the same and to form products having a firm consistency upon heating and cooling.

The method for determining these functional properties of vegetable protein products is as follows:

7 parts of refined vegetable oil (e.g. corn oil) and 3.5 parts of water are well mixed in a blender at maximum speed for 5 minutes. One part of vegetable protein material and additional 3.5 parts of water are added and mixing is continued for an additional 10 minutes. The mixture is quickly heated to 90° C., poured into cups and cooled down overnight to a temperature of about 5° C. Formation of a homogeneous product having a firm consistency without separation of oil or water is indicative of highly functional vegetable protein product.

The weight ratio of the aqueous ammonia phase to the proteinaceous material can vary within the range of about 3:1 to about 15:1.

The pH range for operating the process of the invention is from about 8.0 to about 9.5, preferably 8.5 to 9.2.

Preferably, the process of the invention is effected at a temperature within the range of about 75° C. to about 100° C. The desired temperature may be attained by utilizing a double jacketed construction in the vessel in which the slurry is being held by injecting steam directly or indirectly, or by other heating means such as heating coils.

The time required for the aqueous ammonia to effect the enhancement of the functional properties of the proteinaceous material varies depending on the source, the degree of particle size, pH and temperature. The reaction time can thus vary to a great extent, for example, from one minute or less, to thirty minutes or more. In general the longer the reaction time, within one to thirty minutes, the better the improvement of functional properties. Some improvement, however, is usually observed even after a very short time. The process may be operated under pressure. In such a case the time required is reduced.

Subsequent to the treatment with ammonia, the pH of the slurry is lowered to the initial pH of the untreated proteinaceous material by stripping off the ammonia. This can be done by pulling a vacuum on the warm slurry. Preferably further drying is applied to the product in which the residual ammonia and most of the water are simultaneously removed.

The ammonia treated product should be dried to a water content of less than about 10%. While any suitable drying method which will not impair the functional properties of the protein product and which would assure total stripping of the ammonia may be utilized, it is presently preferred that the product is dried by spray drying. In this case it is preferred that the inlet temperature not be above 300° C. and the outlet temperature not greater than about 120° C., preferably in the range of 80° C.–100° C.

The low functionality proteinaceous starting material may be derived from vegetable proteins which have been denatured such as by heat treatment, treatment with aqueous alcohols and/or other chemical treatment.

In particular, there may be used, for example, defatted or low fat vegetable protein products derived from soybeans, lupins, sesame, cotton seeds, peanuts, rape seeds, sunflowers seeds, maize, wheat, barley, oats, lentils, peas, legumes generally, vegetable leaves and the like, including "flours", "concentrates" and "isolates", as described above.

The invention will be illustrated by the following non-limitative example:

EXAMPLE 1

Aqueous alcohol washed denatured soya protein concentrate of low functionality HAYPRO (Hayes Ashdod Ltd., Israel) 1 kg., having 71% protein on dry basis; 6.5% moisture and pH 6.9, was combined and slurried with 8 liters of water in a double jacketed vessel tank. Concentrated ammonium hydroxide (29% ammonia content) was added to the slurry to provide an initial pH of 9.0. The vessel was tightly closed and steam was injected into the jacket to provide a constant and controlled temperature of 86° C. The walls of the slurry containing vessel were continuously scraped to assure even temperature all through the slurry. After 20 minutes, the warm slurry was vented, transferred from the vessel tank by means of a pump and dried in a spray drier (APV Anhydro) with an inlet temperature of 280° C. and an outlet temperature of 98° C. to a final moisture content of 3%. The spray dried product was found to contain 71% protein on dry basis; 3% moisture and pH 6.9.

Samples of untreated and treated soya protein concentrates were tested for functionality by the method hereinbefore described. The low functionality untreated product did not form any firm consistency and did not hold the oil and the water, whereas the treated protein formed a very viscous and firm consistency product and no oil nor water separation were observed.

EXAMPLE 2

A comparative test was conducted to measure the functional properties of treated soya protein concentrate of Example 1 with a soya protein concentrate, STA-PRO, 66.5% protein on dry basis, (A. E. Staley Manufacturing Co., Decatur, Ill., U.S.A.) understood to be manufactured according to U.S. Pat. No. 4,234,620. The functional test described above was applied to both samples.

The viscosities of 10% solids in water concentration were also measured by a Brookfield Viscosimeter (12 rpm: SPDL 2: 25° C.) after 2 and 10 minutes and the water and fat binding capacities were measured by a modified method of the one disclosed hereinbefore in which the amounts of water and oil were adjusted to give equally firm consistency products without water or oil separation. The results are shown below.

| | Test Results | |
|---|---|---|
| | Example 1 | U.S. Pat. No. 4,234,620 |
| Viscosity (CPS) | | |
| 2 minutes | 2500 | 750 |
| 10 minutes | 2200 | 370 |
| Water absorption | | |
| Wt. Water/wt. protein | 6.1:1 | 4.5:1 |
| Water/oil binding capacity | | |
| Wt. protein:wt. water:wt. oil | 1:10:10 | 1:7:7 |
| Total Ash | 5.8% | 7.5% |
| Sodium | 0.02% | 0.4% |

The product of Example 1 had far better water absorption, water and fat binding, higher viscosity "body" forming capacity, as well as higher protein content and lower total ash and especially much lower sodium than the STA-PRO product.

EXAMPLE 3

Another comparison was conducted wherein an aqueous alcohol denatured soya protein concentrate HAYPRO (Hayes Ashdod Ltd.) was treated according to British Patent No. 1,575,052 Example VII by adding calcium hydroxide and calcium carbonate to an aqueous suspension thereof to give a pH of 7.5, heating at 90° C. for 30 minutes and spray drying the product. The product obtained was tested by the method hereinbefore described. The results are tabulated in Table I. The treated product had no firm consistency and did not hold the oil and water. It behaved similarly to the control of Example 1, i.e. untreated protein.

TABLE I

| Product | Control[1] | Example 1 | U.S. Pat. No. 4,234,620 | GB 1,575,052 |
|---|---|---|---|---|
| Viscosity | low | high | medium-low | low |
| Water absorption | low | high | medium | low |
| Water/oil holding | low | high | medium-high | low |

[1] Denatured untreated vegetable protein (soya protein concentrate)

While the invention has been described above with reference to particular embodiments, it will be appreciated by those skilled in the art that many variations and modifications may be made. The invention is accordingly not to be construed as limited to such embodiments, but is defined only by the claims which follow.

I claim:

1. A process for enhancing the functional properties of denatured proteinaceous material of vegetable origin, said properties including at least one property selected from the group consisting of water absorption, water binding capacity, oil binding capacity, fat binding capacity, and the ability to produce viscous aqueous suspensions, said process comprising:
   obtaining said denatured proteinaceous material by treating undenatured proteinaceous material with aqueous alcohol; and
   maintaining a slurry of said denatured proteinaceous material in warm aqueous ammonia in which the weight ratio of the aqueous phase to solids is between 3:1 to 15:1 at a temperature between 75° C. to 100° C. and within a pH range of from 8.0 to 9.5.

2. A process according to claim 1, wherein the slurry of proteinaceous material in aqueous ammonia is maintained between 1 and 30 minutes.

3. A process as in claim 1, wherein the pH ranges from 8.5 to 9.2.

4. A process according to claim 1, wherein the ammonia is subsequently stripped from the proteinaceous material.

5. A process according to claim 4, wherein the ammonia is stripped by vacuum.

6. A process according to claim 1, wherein the product is dried to a water content of less than 10% by weight.

7. A process according to claim 5, wherein the product is dried and ammonia is stripped during the drying stage.

8. A process according to claim 6, wherein the product is dried by means of a spray drier.

9. A process according to claim 8, wherein the inlet temperature of the spray drier is no greater than about 300° C.

10. A process according to claim 8, wherein the outlet temperature of the spray drier is no greater than about 120° C.

11. A process according to claim 10, wherein the outlet temperature lies within the range of about 80° C. to 100° C.

* * * * *